United States Patent [19]

Ammann et al.

[11] 4,264,299

[45] Apr. 28, 1981

[54] PROCESS AND APPARATUS FOR CONTROLLING LOSSES IN VOLATILE WORKING FLUID SYSTEMS

[75] Inventors: Hans H. Ammann, Chester; Michael A. Oien, Chatham Township, Morris County, N.J.

[73] Assignee: Bell Telephone Laboratories, Incorporated, Murray Hill, N.J.

[21] Appl. No.: 129,623

[22] Filed: Mar. 12, 1980

[51] Int. Cl.[3] ............... F27B 14/00; F28D 15/00
[52] U.S. Cl. ............... 432/13; 165/105; 432/19; 432/23; 432/128; 432/152; 432/171
[58] Field of Search ............... 432/13, 19, 23, 128, 432/152, 171; 165/105

[56] References Cited

U.S. PATENT DOCUMENTS

| | | | |
|---|---|---|---|
| 2,515,489 | 7/1950 | Borushko | 117/202 |
| 2,582,789 | 1/1952 | Morrison | 62/104 |
| 3,028,267 | 4/1962 | Edhofer et al. | 134/7 |
| 3,078,701 | 2/1963 | Rand | 68/18 |
| 3,866,307 | 2/1975 | Pfahl, Jr. et al. | 29/498 |
| 3,904,102 | 9/1975 | Chu et al. | 228/180 |
| 3,982,889 | 9/1976 | Olson | 432/128 |
| 4,012,847 | 3/1977 | Rand | 34/75 |
| 4,029,517 | 6/1977 | Rand | 134/11 |
| 4,077,467 | 3/1978 | Spigarelli | 165/105 |
| 4,194,297 | 3/1980 | Pfahl, Jr. | 165/105 |

OTHER PUBLICATIONS

NEPCON Proceedings, 1967, pp. 259-264, "Condensation Soldering with Vapor Blanket Reduces Cost of This High Yield", Feb. 24-26, 1976.

Primary Examiner—John J. Camby
Attorney, Agent, or Firm—John W. Fisher

[57] ABSTRACT

A process and apparatus are disclosed for controlling losses in volatile working fluid systems. In accordance with the process, the object upon which a work operation is to be effected is sequentially moved from a first sealable chamber to a second such chamber and back to the first chamber. While in the second chamber the object is exposed to a working fluid vapor which elevates the temperature of the object to a level near the boiling point of the working fluid. Thereafter, while still in the second chamber, a substantial portion of the working fluid is drained from the object such that the sensible heat acquired by the object upon its elevation of temperature is sufficient to evaporate working fluid remaining on the object upon its removal to the first chamber. Upon removal of the object to the first chamber the object is thoroughly dried through control of the partial pressure of the working fluid vapor contained within the first chamber atmosphere. This control is effected by a closed devaporization loop coupled to the first chamber. In addition, any working fluid which may have been deposited on surfaces within the first chamber is revaporized by auxilliary heating means. Virtually all of this working fluid vapor is recovered by extended devaporization of the atmosphere. Throughout the process any pressure differentials which exist between an internal atmosphere within the first and second chambers and an external atmosphere are equalized by means of a snorkellike member.

45 Claims, 13 Drawing Figures

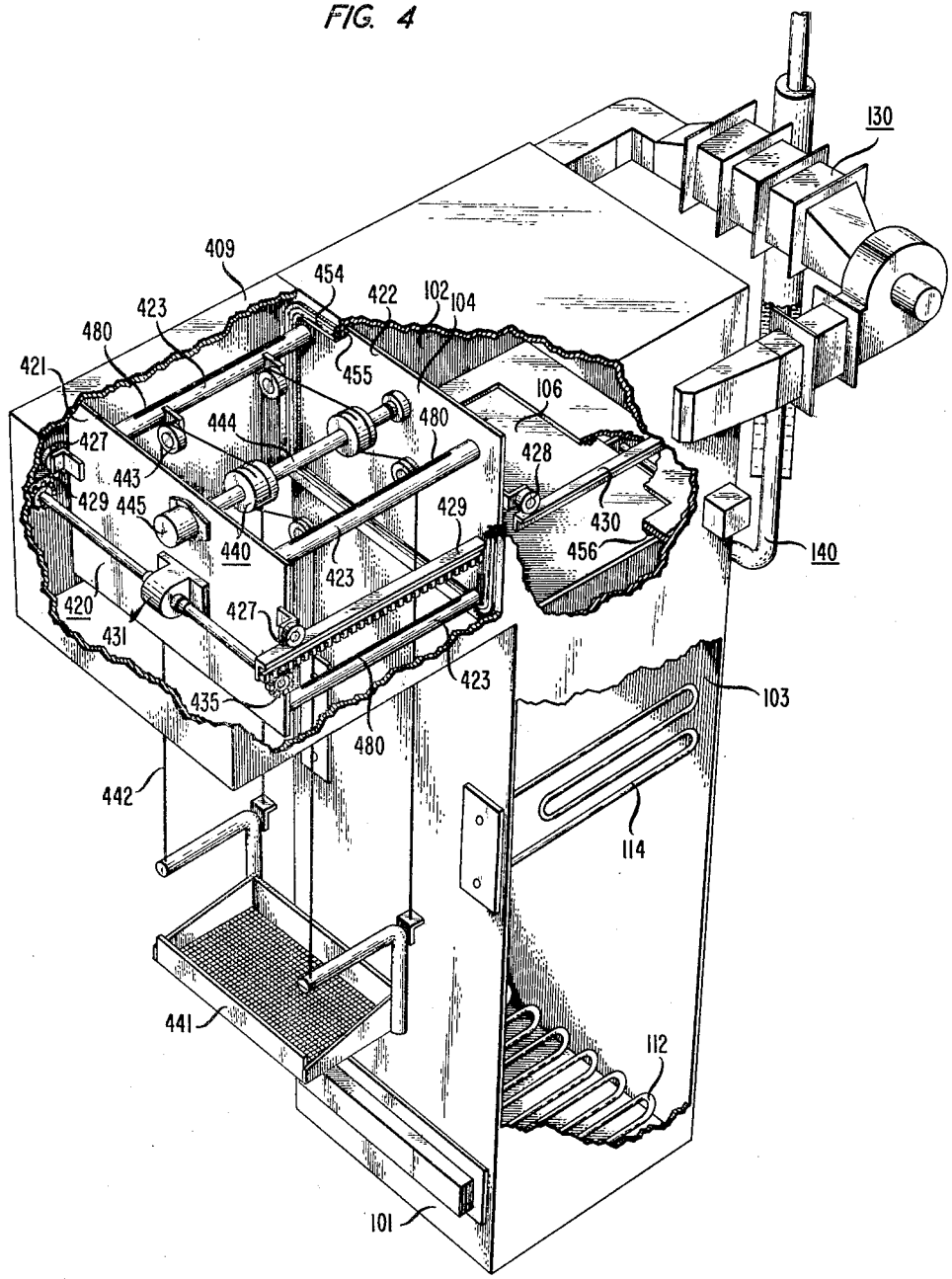

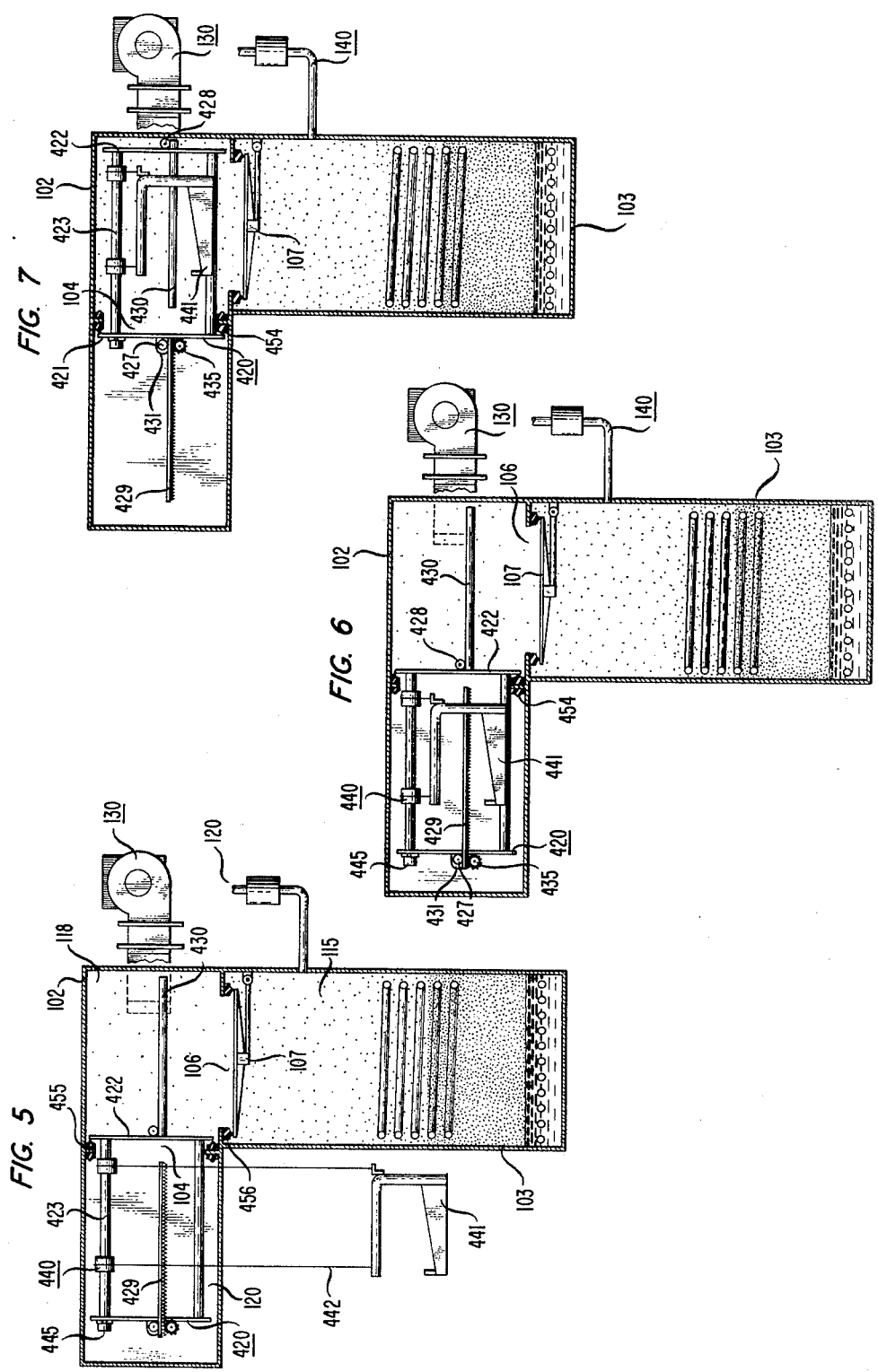

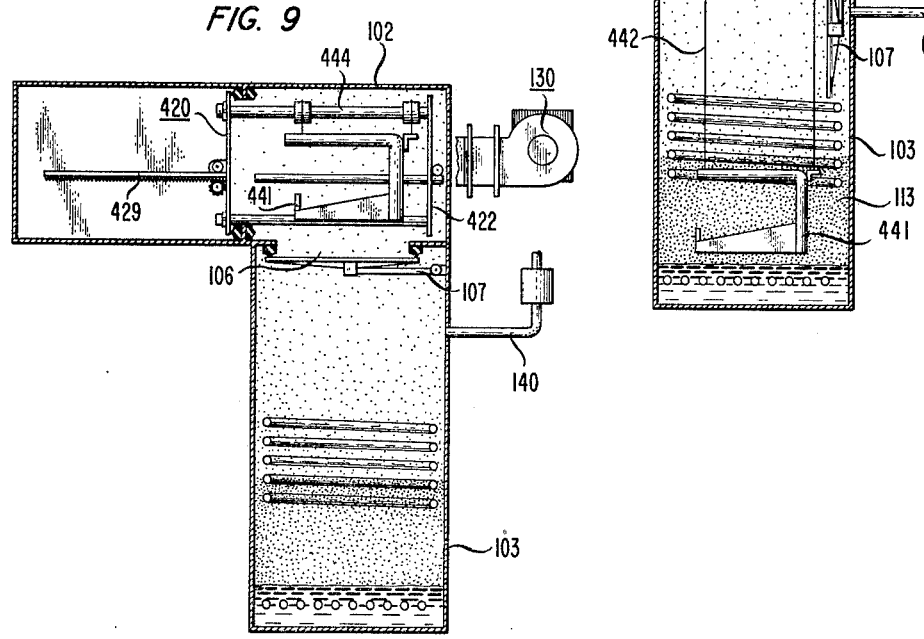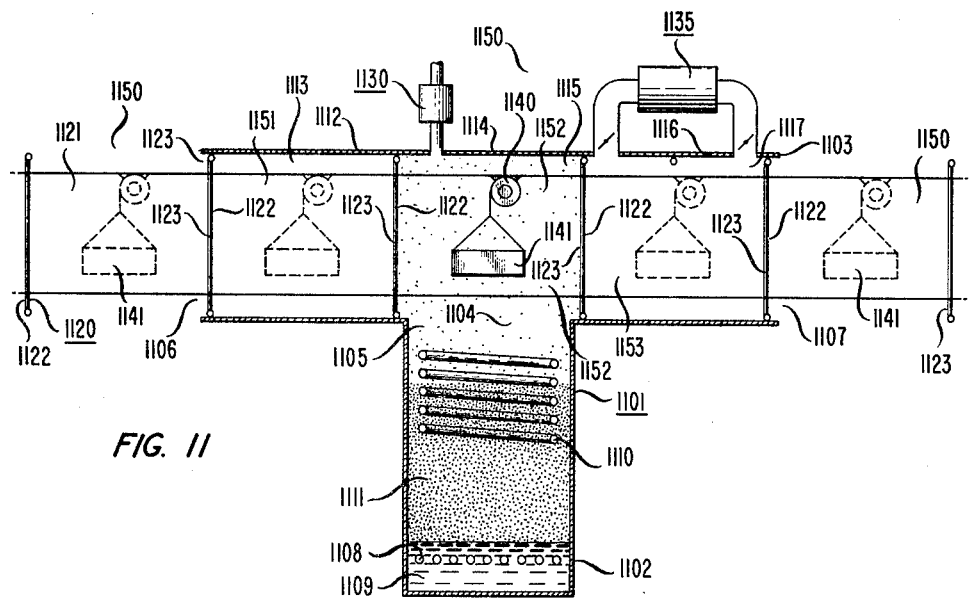

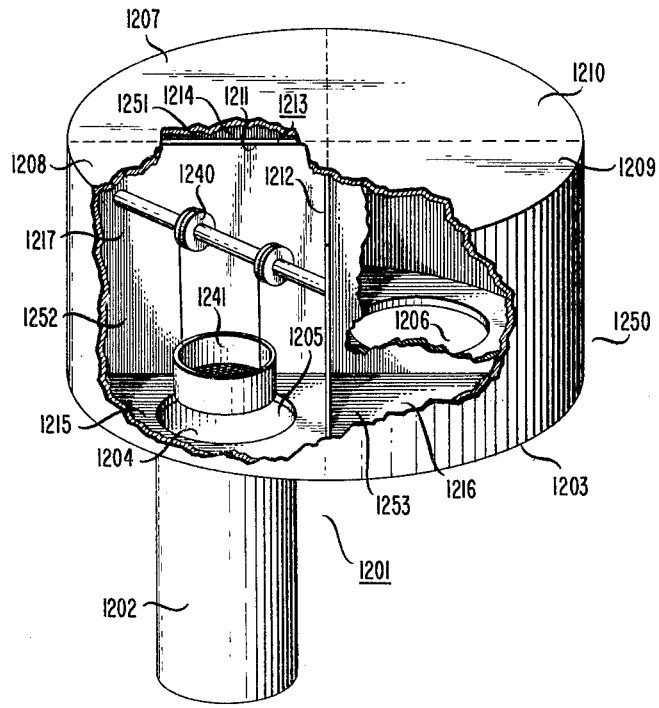
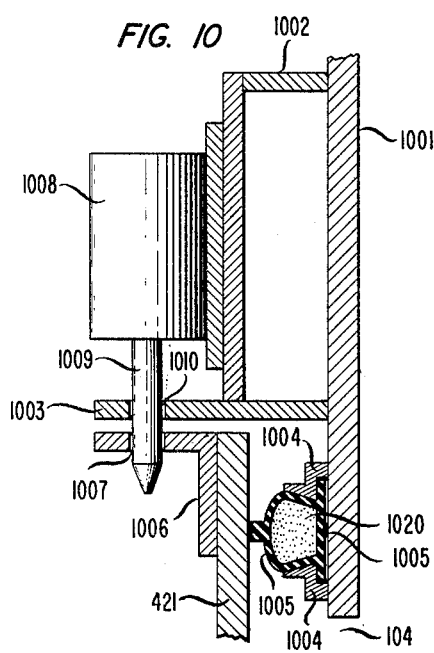

PROCESS AND APPARATUS FOR CONTROLLING LOSSES IN VOLATILE WORKING FLUID SYSTEMS

BACKGROUND OF THE INVENTION

1. Technical Field of the Invention

This invention relates to heat exchange systems such as condensing and evaporating systems and, in particular, to systems wherein a volatile working fluid and its vapors are employed to effect operations on an object and the losses of the fluid and its vapor are controlled to reduce operating costs and environmental contamination. Even more specifically, the subject process and apparatus may be employed advantageously to control working fluid losses and vapor emissions in such commonplace industrial technologies as vapor degreasing, volatile solvent cleaning, condensation heating for reflow solder assembly, condensation heating for fusing solder plating, and numerous other related applications.

2. Description of the Prior Art

Over the years various processes have been developed in which an object is exposed to a volatile working fluid. For example, vapor degreasing processes and solvent cleaning processes have been employed to remove various contaminants or residues from a wide range of manufactured pieceparts. More recently, fluorocarbons have been used at elevated temperatures to effect solder fusing or solder reflow assembly on numerous electronic components.

These processes typically suffer significant losses of the volatile working fluid. Such losses affect the costs involved in the utilization of the processes. Furthermore, with increasing governmental regulations affecting health, safety and the environment, emissions of the working fluid vapors or its products of decomposition must be more stringently controlled. Existing machines and apparatus for implementing these processes are becoming increasingly inadequate.

An early example of a process utilizing a volatile working fluid is set forth in M. J. Borushko, U.S. Pat. No. 2,515,489 issued July 18, 1950. Borushko relates to a coating process adapted for use in applying various types of coatings to various types of articles. This process is adapted for applying coatings which are characterized as consisting of one or more suitable film forming components dissolved in one or more volatile solvents.

Implementation of the process involves the use of a dip tank consisting of two elements. The first element is comprised of a lower tank section which holds a solution of the coating material to be applied. This lower tank section is fitted with some heating means. The second element is comprised of an upper tank section which functions as a drying chamber and solvent vapor condenser. This upper tank section is in reality an upward extension of the sides of the lower chamber. The upper section is surrounded by a jacket through which a cooling fluid is circulated.

In practice the solution of the coating material is placed in the lower chamber. Heat is applied and when the solution has attained a suitable temperature, which may generally be said to be a temperature near the boiling point of the solvent, the article to be coated is immersed in it and held there until the article itself has become heated. It is then raised and held in the upper tank section, whereupon the heat contained within the article causes the solvents to be driven out of the film, and the solvent vapors pass to the cold sides of the chamber where they are condensed and from which they flow back into the chamber below.

While Borushko recognizes the advantage to be derived in heating the article to a temperature near the boiling point of the solvent, he does not consider the losses of solvent which may occur due to the convective interchange between the atmosphere within the apparatus and that exterior thereto. The atmosphere within the upper tank section is comprised of an air and solvent vapor mixture in which the vapor portion is continually being replenished by the evaporation of solvent from the surface of the hot coating liquid in the lower tank section as well as by the solvent vapor being driven off the article. Some of the solvent contained in the air and vapor mixture is removed by condensation onto the cold sidewalls.

The condensation process is somewhat enhanced by the natural convection of the atmosphere within the upper chamber. This natural convection is induced by the heating effects of the hot article and the hot coating liquid at the bottom of the chamber and by the chilling effect of the cold sidewalls. However, the condensation removal process cannot progress beyond the saturation level of the air and vapor mixture corresponding to the temperature of the chilled sidewalls. In practice, the partial pressure of the vapors within the atmosphere of the chamber will be well above this chilled sidewall saturation level. This results from the relatively slow convection within the chamber and the resultant necessity of the vapor diffusing over a relatively large boundary layer in order to be condensed at the chilled sidewalls. Consequently, the atmosphere within the upper chamber always contains a significant amount of solvent vapor.

In the absence of a physical closure, the natural convective forces within the upper chamber will lead to substantial convective interchange between the air and vapor atmosphere within the chamber and the environment exterior thereto. This convective interchange results in losses of the solvent and may lead to the emission of gaseous products of decomposition of the solvent as well.

Another example of a process and apparatus utilizing a volatile working fluid for cleaning rigid objects is disclosed in G. Edhofer et al, U.S. Pat. No. 3,028,267 issued Apr. 3, 1962. This patent relates to cleaning rigid objects which have become contaminated with grease, oil, dirt, metal shavings and the like. The objects to be cleaned are first degreased by the vapors of a solvent containing fillers. Then, while the objects are still moist with the solvent, they are immersed in a liquid solvent containing fillers. Subsequently, the objects are immersed in washing chambers containing liquid solvent without fillers. The major quantity of dirt and grease removed by the condensate dripping off the treated object is deflected away from the chamber containing the fillers by a drip shield or pan and the soiled condensate conducted away for distillation.

Although Edhofer et al utilize a partial draining of the objects in their process, they do so in order to capture the contaminated solvent and prevent it from being deposited back in the chamber containing clean solvent with fillers. Moreover, since the apparatus is open at the top and since the atmosphere above the solvent chambers is not controlled to limit the amount of solvent vaporized therein, significant losses of solvent occur.

Still another example of the developing technology in the use of volatile working fluids is evidenced by B. Rand, U.S. Pat. No. 3,078,701 issued Feb. 26, 1963. Rand '701 discloses an air recirculation system for cleaning apparatus. A closed circuit air recirculation system is used for withdrawing a mixture of air and vaporized solvent from within the cleaning apparatus with the air being returned to the apparatus after the concentration of the vaporized solvent is reduced.

Although in Rand '701 some control is exerted over the amount of solvent contained within the internal atmosphere, it should be noted that this control is not very effective. The reason for this relative ineffectiveness is due to the direct exposure of the internal atmosphere to the source of solvent. Consequently, while on the one hand the concentration of the vaporized solvent is reduced through the external loop, on the other hand the presence of the heated solvent in the internal atmosphere causes the concentration to be increased. Under these conditions the relative partial pressure of the vaporized solvent in the internal atmosphere cannot be effectively controlled to a sufficiently low level. Coupling this relatively ineffective control with the fact that in Rand's apparatus there is at least one opening to the external environment, the emission of solvent from the apparatus is still significant.

A further example of a process utilizing a volatile working fluid is set forth in R. C. Pfahl, Jr. et al, U.S. Pat. No. 3,866,307 issued Feb. 18, 1975. Pfahl, Jr. et al disclose that an article to be soldered, fused or brazed is placed in hot saturated vapors generated by continuously boiling heat transfer liquid having selected properties including a boiling point at least equal to, and preferably above, the temperature required for operation. Vapors condense on the article and give up their latent heat of vaporization to heat the article to the temperature needed for soldering, fusing or brazing.

While the Pfahl, Jr. et al process represents a dramatic improvement in the soldering, fusing and brazing art, the losses of the expensive working fluid increase the operating costs significantly. One approach advanced to reduce these operating costs is disclosed in T. Y. Chu et al, U.S. Pat. No. 3,904,102 issued Sept. 9, 1975. In Chu et al a blanket of secondary vapor, having a density intermediate that of the primary vapor and the atmosphere, is floated on the body of primary vapor in order to reduce the losses of the primary vapor. The article on which the soldering, fusing or brazing operation is to be performed is passed through the body of secondary vapor into the body of primary vapor in the vessel. Primary vapor condenses on the article and the latent heat of vaporization of the condensing primary vapor heats the article to the temperature required for the soldering, fusing or brazing operation. After completion of the operation, the article is withdrawn from the body of primary vapor through the blanketing body of secondary vapor, out of the vessel and into the atmosphere where it is cooled to ambient temperature.

It should be evident that in Pfahl, Jr. et al and Chu et al, the processes disclosed utilize essentially an open apparatus. As such, these processes suffer many of the same shortcomings as heretofore discussed with respect to Borushko.

A more recent illustration of the developments being made in the use of volatile working fluids is provided by B. Rand, U.S. Pat. No. 4,012,847 issued Mar. 22, 1977. Rand '847 relates to a solvent recovery system for use with a process chamber having unsealed inlet and outlet ports. Included in the system are means for recovering vaporized solvent from the chamber in two stages. The first stage comprises a chiller for removing a portion of the vaporized solvent. The second stage is comprised of an adsorber for recovery of the vaporized solvent. Additionally, means for causing the air and vaporized solvent to flow from the housing to the chiller and then to the air circulation system are also utilized.

The Rand '847 system does not address the problems involved with controlling losses of the solvent to the atmosphere. This is clearly the case since Rand specifically indicates that seals at the inlet and outlet ports are not deemed necessary. Moreover, the Rand '847 apparatus cannot be used to expose an article to a volatile working fluid to effect an operation thereon. Its use is only for recovery of any working fluid remaining on the article after its exposure to the working fluid.

One attempt to reduce working fluid losses through the use of a nominally closed chamber is disclosed in B. Rand, U.S. Pat. No. 4,029,517 issued June 14, 1977. Rand '517 relates to a vapor degreasing system having a divider wall between upper and lower vapor zone portions. The workpiece is introduced into an upper chamber and a sliding door is closed. A lower door is opened allowing vapors from a lower chamber to rise into the upper chamber. After a period of time a condenser in the lower chamber is reactivated causing the vapor level to drop. At this point the lower door is closed separating the upper chamber from the lower chamber.

While Rand '517 partially addresses the problem of working fluid losses and emissions, during the time period when the vapor is rising, it mixes with the air in the upper chamber forming an air and vapor mixture. This mixture must be displaced by the rising vapor resulting in the emission of a portion of the air and vapor mixture through the sliding door. Correspondingly, when the vapor is lowered, air must enter the upper chamber to displace the dropping vapor. As a result, it is clear that the sliding doors cannot be sealed. This lack of a tight seal allows for further fluid losses while the vapor resides in the upper chamber.

A more recent example of the advances made in systems using volatile working fluids is evidenced by D. J. Spigarelli, U.S. Pat. No. 4,077,467 issued Mar. 7, 1978. Spigarelli relates to a method and apparatus for soldering, fusing and brazing. The apparatus is such that an article to be soldered is sequentially inserted into first and second confined regions of hot saturated vapors and sequentially removed therefrom. The article remains temporarily in the first confined region of hot saturated vapors of a primary high temperature liquid such that the vapors condense on the article to heat it.

The article is then removed to the second confined region which contains a body of hot saturated vapors of a secondary liquid having a lower boiling point and density than the primary liquid. This secondary liquid serves as a vapor blanket and causes the primary vapors to condense and return to the primary liquid reservoir. The temperature of the secondary liquid is controlled independently of the primary liquid. Any primary and secondary liquids and flux remaining on the article after soldering can be removed by spraying the article with distilled secondary liquid as it passes through the secondary vapors on the removal of the article from the apparatus.

In his preferred embodiment, Spigarelli has focused on the minimization of the height and consequent cost of the apparatus, as well as the conservation of the primary working fluid. However, the apparatus is subject to significant losses of the secondary working fluid as well as some losses of the primary fluid. This result obtains because the atmosphere above the saturated secondary vapor zone, forming the vapor blanket in the second confined region, is a mixture of primary vapor, secondary vapor, and air. This atmosphere is particularly rich in secondary vapor because of diffusion and the natural convective interchange with the hot saturated vapors forming its lower boundary. It also contains primary vapors which have escaped from the first confined region and which have evaporated from the article as it is removed from the first confined region. In practice, the partial pressure of the primary working fluid is in excess of its saturation vapor pressure corresponding to the temperature of the condensers in the second confined region. Also, the partial pressure of the secondary working fluid can be expected to be well in excess of its corresponding saturation vapor pressure.

When the door of the second confined region is opened to withdraw the article, the natural convective forces within this chamber as well as the movement of the article causes significant convective interchange between the atmosphere within the second confined region and the environment exterior thereto. Consequently, the vapors contained within the atmosphere of the second confined region are subject to losses as recognized by Spigarelli. In addition, any gaseous products of decomposition of the primary and secondary working fluids which might be contained within this atmosphere also would be emitted into the environment.

A second loss mechanism exists for the Spigarelli apparatus. This loss mechanism is similar to that which exists in Rand '517. When an article is first immersed in a zone of saturated working fluid vapor having a temperature higher than the article, the vapors rapidly condense onto the workpiece, thereby causing a sudden drop in the level of the saturated vapor into which the article is immersed. This drop in vapor level will cause a reduction in the atmospheric pressure within the apparatus so that there will be a tendency for air from the exterior environment to enter the apparatus through any door or closure which is not completely sealed until the interior pressure is equilibrated with the exterior pressure. Subsequently, as the vapor is replenished and the vapor level rises, the atmospheric pressure within the apparatus will tend to rise so that there is a tendency for the vapor-laden atmosphere within the apparatus to be expelled, hence giving rise to a loss of working fluid. This problem with the "breathing" of the apparatus during the processing of an article is characteristic of other embodiments of Spigarelli as well.

A third loss mechanism for liquid working fluid exists in the preferred embodiment of Spigarelli as well as other embodiments in which liquid secondary working fluid is sprayed onto the article for the purpose of rinsing off condensed primary working fluid or for the removal of flux residue after soldering, fusing or brazing. Spigarelli does not provide for the effective draining of working fluid from the article nor does he provide for the utilization of the heat which may be provided to the article by the working fluids to enhance the later evaporative removal of the working fluids from the article. Consequently, in the absence of an active drying process performed upon the article, the removal of the article from the apparatus may also involve the loss of liquid working fluid retained upon the article.

An alternative embodiment includes the addition of a further chamber which is utilized for preheating and drying purposes. The article is initially placed within the preheating chamber. The article and any soldering flux associated therewith are heated to a temperature in excess of the boiling point of the secondary vapors in the intermediate secondary vapor chamber. This preheating permits the article and the flux material thereon to be passed through the intermediate vapor blanket on its way into the high temperature primary chamber without removal of the flux.

In utilizing this process the article tends to be cooled as it is removed through the secondary vapor blanket after the soldering, fusing or brazing operation in the primary chamber. Before removal, the article is held in the preheating chamber. It is specifically noted by Spigarelli that heaters in this chamber heat the surface of the article for drying and that condensed secondary vapors present on the article are vaporized. Such vapors then pass upwardly to cooling coils lining the upper interior walls of the preheating chamber. At the coils, these vapors are recondensed and return to the lower portion of the secondary vapor chamber.

This alternate embodiment of Spigarelli also suffers losses of the working fluid vapors, although the rate of loss is lower than for the preferred embodiment. The atmosphere within the drying chamber contains a mixture of primary working fluid vapor, secondary working fluid vapor and air as was the case in the earlier discussion. By isolating this chamber from the intermediate secondary vapor chamber, a major source of replenishment of secondary vapors within the drying chamber is eliminated. However, an initial charge of working fluid vapor is provided by convective interchange when the atmosphere of the drying chamber and the intermediate chamber are in communication during the removal of the article from the intermediate chamber into the drying chamber. In addition, the evaporation of secondary working fluid from the article upon being heated in the drying chamber provides an additional source of vapors in the atmosphere of the drying chamber.

One problem with this scheme is that the apparatus cannot provide for the effective recovery of the vapors contained within the air and vapor mixture constituting the atmosphere of the drying chamber. The utilization of a recirculation fan for the purpose of enhancing the heating and drying of the article does not promote the effective recovery of the working fluid vapors by condensation on the cooling coils provided within the chamber because the vapors are required to diffuse across a large boundary layer owing to the ineffectual nature of the forced convection scheme used in the chamber.

In addition, the working fluid, which condenses on the cooling coils of the drying chamber, is free to flow down onto the lower surfaces of the chamber. These surfaces are being heated by the recirculating hot air from the heaters and by direct communication with the heat from the intermediate chamber. Consequently, the condensate may be reevaporated thereby continually replenishing the vapor within the atmosphere of the drying chamber.

Owing to the somewhat ineffectual means for recovering the vapor contained within the atmosphere of the drying chamber, when the door is opened to remove the article, losses of the working fluid result through convective interchange of its vapor-laden atmosphere with that of the exterior environment.

SUMMARY OF THE INVENTION

The problems associated with the heretofore discussed prior art are overcome in our process and apparatus for controlling losses in volatile working fluid systems. In accordance with our process the losses of a volatile working fluid are controlled during an operation involving exposure of an object thereto. The object is introduced into a first chamber and this chamber is sealed by a first closure means. Thereafter a second closure means is opened. This second closure means separates the first chamber from a second chamber. Contained within the second chamber is a source of working fluid at elevated temperature. After the second closure means is opened, the object is conveyed from the first chamber to the second chamber.

The temperature of the object is then elevated to a level near the boiling point of the working fluid by exposure of the object to the working fluid. Following exposure, the object is allowed to remain in the second chamber until a substantial portion of the working fluid drains from it.

After the draining operation is completed, the object is then removed from the second chamber into the first chamber and the first chamber is sealed by closing the second closure means. With the object back in the first chamber the sensible heat acquired by the object upon its elevation of temperature is sufficient to evaporate working fluid remaining on the object. When the object is dry it is removed from the first chamber.

Three additional aspects of the process are worthy of mention at this time. First, to further control the amount of working fluid losses, the partial pressure of the working fluid vapor contained in an atmosphere within the first chamber is reduced. This reduction is effected by recirculation of the atmosphere through a closed devaporization loop which is coupled to the first chamber. By reducing the partial pressure of the working fluid vapor, any working fluid remaining on the object is better able to evaporate into the atmosphere within the first chamber by means of the sensible heat of the object.

Second, by further reducing the partial pressure of the working fluid vapor contained in the first chamber atmosphere to a predetermined level, the potential for loss of the working fluid into the external environment upon the opening of the first closure means is reduced to an extremely low level. This reduction in partial pressure is implemented by additional recirculation of the first chamber atmosphere through the devaporization loop.

Third, by equalizing any pressure differentials between an internal atmosphere within the first and second chambers and an external atmosphere throughout the process implementation, any losses which might have occurred through a so-called "breathing" of the apparatus are greatly diminished. To effect this equalization of pressures, a snorkellike member is used.

BRIEF DESCRIPTION OF THE DRAWINGS

The aforementioned aspects of our invention, as well as other aspects, will be better understood upon consideration of the following detailed description and appended claims taken in conjunction with the attached drawings of an illustrative embodiment in which:

FIG. 4 is a simplified perspective view of apparatus used in practicing the process;

FIGS. 5 through 9 illustrate the progressive movement of an object through the apparatus during the practice of the process;

FIG. 10 illustrates the type of seals used with the closure means to prevent the escape of volatile working fluid from the apparatus;

FIG. 11 is a simplified alternative embodiment of the process and apparatus;

FIG. 12 is a simplified further alternative embodiment of apparatus for practicing the process illustrated in FIG. 11.

DETAILED DESCRIPTION

Figure 1:
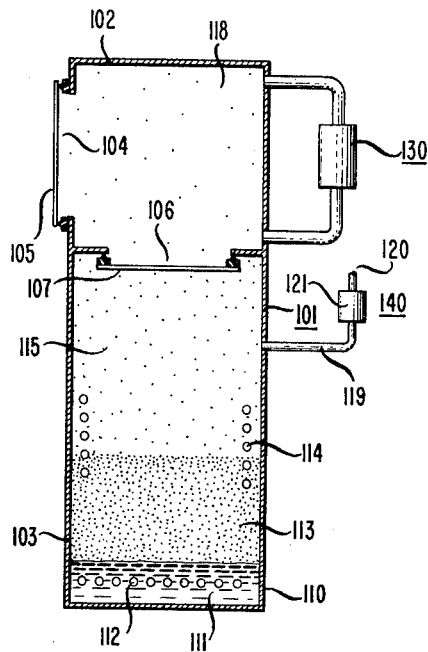
FIG. 1 is a simplified embodiment used to illustrate the process for controlling losses of a volatile working fluid.

A simplified illustration of apparatus for controlling losses in volatile working fluid systems is shown in FIG. 1. This apparatus comprises an enclosure 101 having first and second chambers 102 and 103, respectively. Access to chamber 102 is gained through aperture 104 which is sealable by closure 105. Correspondingly, access from chamber 102 to chamber 103 is gained through aperture 106 which is sealable by closure 107.

Occupying the bottom of chamber 103 is a sump 110 containing liquid working fluid 111. Positioned within sump 110 are heaters 112. In vapor degreasing and reflow solder applications, heaters 112 are used to boil liquid working fluid 111 to produce and maintain a zone of saturated working fluid vapor 113. The height of saturated vapor 113 above sump 110 is controlled by condenser coils 114. Above saturated vapor 113 is an atmosphere 115 comprised of a mixture of air and working fluid vapor.

It should be noted that in an alternative embodiment (not shown) useful for solvent cleaning applications, such as flux removal following solder assembly of electronic components, heaters 112 are used to heat liquid working fluid 111 to a temperature just below its boiling point. A stream of this hot working fluid 111 is withdrawn from sump 110 and sprayed onto the object to clean it.

As the work operation commences aperture 106 is closed and sealed by closure 107 and aperture 104 is open. At this stage the partial pressure of the working fluid vapor in atmosphere 118 is at such a low level as to be virtually insignificant. Not only is atmosphere 118 virtually free of working fluid vapor, but all inner surfaces of chamber 102 are free of any working fluid. Consequently, under these conditions there is no mechanism whereby any significant losses of working fluid can occur.

The object (not shown), which is to be exposed to saturated vapor 113, is introduced through aperture 104 into chamber 102 and closure 105 is closed and sealed. A mechanism for effecting this introduction of the object into chamber 102 and subsequent transport to and from chamber 103 is described below.

With the object in chamber 102 and closure 105 closed and sealed, closure 107 is opened and the object is conveyed from chamber 102 to a position within saturated vapor 113. For processes of interest the boiling point of liquid working fluid 111 producing saturated vapor 113 generally is significantly higher than the initial temperature of the object as it enters enclosure 101.

Upon being exposed to saturated vapor 113, the object is heated by virtue of saturated vapor 113 giving up its sensible heat and latent heat of vaporization as it condenses on the object. The rate of heating of the object is a maximum during initial exposure and, as time progresses, the temperature of the object asymptotically approaches the temperature of saturated vapor 113. Correspondingly, the rate of condensation of the working fluid on the object is a maximum during initial exposure and asymptotically approaches zero as time progresses.

During the initial stage of heating, the condensation of saturated vapor 113 onto the object forms a film of condensate of progressively increasing thickness. As working fluid condensate begins to accumulate, it also begins to drain from the object. By providing suitable means for draining the working fluid condensate from the object, the amount of working fluid retained thereon increases to a maximum level at some intermediate time, and then decreases as time progresses. As the temperature of the object approaches the temperature of saturated vapor 113 and the rate of deposition of condensate onto the object approaches zero, the continued draining of condensate from the object leads to a condition whereby the sensible heat stored within the object is in excess of the heat required to revaporize the working fluid condensate retained on the object.

To enhance revaporization of the retained condensate by the sensible heat of the object, it is of benefit to adopt measures which assure that the retained working fluid is suitably distributed over the surface of the object. For example, the object can be advantageously oriented such that the condensed working fluid drains freely and does not form pools in certain parts of the object having limited localized heat capacity insufficient to revaporize such pools. It should be noted that the same thermodynamic processes being described for the object also are effected on the portion of the conveyance means transported with the object into saturated vapor 113.

When the object reaches a temperature near the boiling point of liquid working fluid 111 and when draining of working fluid condensate from the object progresses to the point where the sensible heat acquired by the object is sufficient to reevaporate any working fluid condensate remaining thereon, the object is withdrawn from chamber 103 into chamber 102. The working fluid condensate retained on the object begins to evaporate into atmosphere 115 in the upper part of chamber 103 as soon as the object is withdrawn from saturated vapor 113. Evaporation continues as the object is transported through aperture 106 into atmosphere 118 within chamber 102. Evaporation further continues in atmosphere 118 until the object is essentially dry of any working fluid condensate.

This result obtains because the partial pressure of the working fluid vapor in atmosphere 118 is maintained at a suitably low level. Control of the partial pressure is effected by closing and sealing aperture 106 with closure 107 and by recirculating atmosphere 118 through closed devaporization loop 130.

Figure 2:
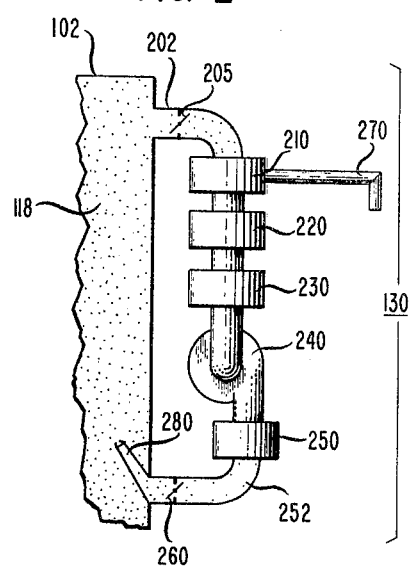
FIG. 2 is a simplified embodiment of a closed loop devaporation system used to control the partial pressure of the working fluid vapor within a drying chamber atmosphere.

Devaporization loop 130 in its preferred embodiment is shown in FIG. 2. This loop includes condenser 210, heater 220, filter 230, blower 240, and heater 250. A portion of atmosphere 118 is continuously withdrawn from chamber 102 through duct 202. Valve 205 within duct 202 can be used to seal off devaporization loop 130 from chamber 102 during those work operations in which the devaporizer is not employed.

Upon entry into devaporization loop 130 the air and vapor mixture is passed through condenser 210. Condenser 210 chills the mixture to a temperature sufficient to cause condensation of a substantial portion of the working fluid vapor. In addition, a substantial portion of any other condensable corrosive products and toxic products are removed from the mixture through this condensation process. Once the working fluid vapor and any other corrosive products and toxic products are extracted from the mixture, the condensate so obtained is collected and routed through pipe 270 to a filtration system (not shown). This filtration system further processes the condensate such that clean working fluid is recovered for subsequent use.

Following condensation the atmospheric mixture is passed through heater 220. Heater 220 is used essentially for two purposes. First, it reheats the mixture so that filter 230 which follows is kept reasonably dry thereby increasing its efficiency. Second, heater 220 raises the temperature of the mixture prior to return to chamber 102 thereby increasing the capacity of atmosphere 118 to absorb working fluid being evaporated in chamber 102.

Filter 230, which follows heater 220, serves to remove any noncondensable corrosive products and toxic products still remaining in the mixture following condensation in condenser 210. It should be apparent that not all corrosive products and toxic products are removed by condenser 210 and filter 230. However, because of the continuous recirculation of atmosphere 118 through devaporization loop 130, after a short period of time these products along with the working fluid vapor contained in atmosphere 118 can be advantageously reduced to an acceptable level. An acceptable level is one which satisfies governmentally imposed health and emission standards and/or process economics.

Blower 240, which follows filter 230 in the preferred embodiment, primarily keeps atmosphere 118 in chamber 102 recirculating through devaporization loop 130. Following blower 240 in the preferred embodiment is a second heater 250 which can be advantageously employed to further reheat the processed and devaporized mixture to promote evaporation of any liquid working fluid 111 within chamber 102.

After reheating, the processed mixture is reinjected into atmosphere 118 by passage through duct 252. Similar to duct 202, a valve 260 is contained in duct 252 to provide a means for sealing off devaporization loop 130 from chamber 102. To further enhance the evaporization of working fluid condensate from the object, the processed mixture returned to chamber 102 from devaporization loop 130 is directed onto the object by nozzle 280.

In addition to recovering any working fluid condensed onto the object prior to its removal from enclosure 101, as shown in FIG. 1, it is advantageous to dry the interior surfaces of chamber 102 of any liquid working fluid 111 which may have been deposited thereon. Moreover, it is advantageous to recover any significant amount of vapor which might be contained in atmosphere 118 of chamber 102 prior to opening aperture 104 for removal of the object.

During the period in which aperture 106 is open, the vapor-laden atmosphere 115 in chamber 103 may mix convectively with atmosphere 118 in chamber 102 thereby tending to give rise to condensation of working fluid vapor onto surfaces of chamber 102. To inhibit such condensation, two optional process steps may be advantageously employed.

First, atmosphere 118 in chamber 102 may be continuously recirculated through devaporization loop 130 during the time aperture 106 is open. This is done so as to maintain the concentration of vapor in atmosphere 118 below the level at which condensation on surfaces of chamber 102 tends to occur.

The second optional step is to heat certain surfaces within chamber 102 in order to raise their temperatures above the local "dew point" for the air and vapor mixture comprising atmosphere 118. This heating of surfaces tends to avoid condensation of the working fluid thereon and, if condensate does form, such heating tends to enhance the revaporization of the condensate. This second step may be advantageously employed either by itself or in conjunction with the devaporization step noted previously.

To recover any liquid working fluid 111 which might be deposited on surfaces of chamber 102 or on surfaces of any apparatus therein, two further process steps may be advantageously employed. In particular, heating of certain interior surfaces on which liquid working fluid 111 might tend to be deposited, such as by condensation or by dripping of condensed working fluid from the object or its carrier, may be employed. This heating step would be employed after aperture 106 is closed and sealed to promote the evaporation of such working fluid into atmosphere 118.

Alternatively, or in addition to heating these surfaces, an additional heater 250 may be included in devaporization loop 130 in order to raise the temperature of the processed mixture being recirculated back into chamber 102. This temperature increase promotes evaporation of any liquid working fluid 111 deposited on surfaces of chamber 102. The temperature of the recirculated mixture required to promote such evaporation is generally well below the temperature of the object or apparatus which had been heated to near the boiling point of liquid working fluid 111.

After virtually all of liquid working fluid 111 has been evaporated from the surface of the object and from surfaces of chamber 102 or apparatus contained therein, atmosphere 118 into which the working fluid is evaporated may still contain a significant amount of working fluid vapor. Consequently, it is advantageous to continue to extract the working fluid vapor from atmposphere 118 by recirculation through dvaporization loop 130 until the vapor content is reduced to the acceptable level.

During this extended devaporization of atmosphere 118, added heating of the processed mixture at some point becomes counter productive. This is so because raising the temperature of atmosphere 118 being recirculated through condenser 210 reduces the efficiency of the devaporization process. However, the efficiency of the extended devaporization process can be advantageously controlled by allowing the temperature of the recirculating atmosphere to fall under the influence of the refrigeration supplied by condenser 210. The local stream of air and vapor mixture exiting condenser 210 may be virtually saturated, or even supersaturated in the sense of containing entrained condensate droplets. Consequently, it is advantageous to continue to slightly reheat this exiting stream so as to avoid the deposition of working fluid condensate on filter 230 or other surfaces of chamber 102.

For working operations, such as vapor degreasing and condensation soldering, in which the object is immersed in saturated vapor 113, there is a tendency for pressure fluctuations to occur within enclosure 101. To avoid such pressure fluctuations, it is advantageous to employ a venting system 140, as shown in FIG. 1, to allow enclosure 101 to "breathe." Specifically, as the pressure within enclosure 101 tends to rise, atmosphere 115 within chamber 103 is vented outwardly through a snorkellike tube 119 to an external atmosphere 120. Extractor 121, which is coupled to snorkellike tube 119, strips out any significant working fluid vapors and toxic products and corrosive products associated with the working fluid vapors tending to be emitted from chamber 103 during the outward venting.

Figure 3:
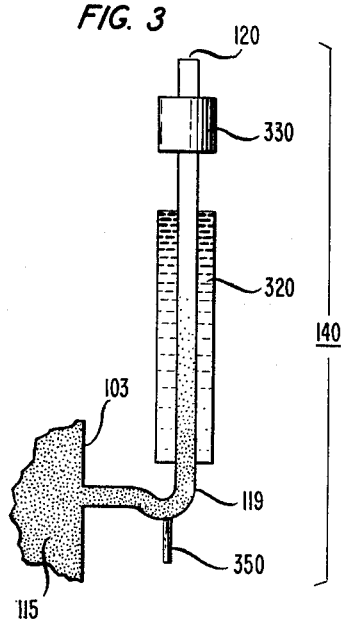
FIG. 3 is a simplified embodiment of a pressure equalization system used in conjunction with the apparatus for practicing the process.

The preferred embodiment of venting system 140 is shown in FIG. 3. Snorkellike tube 119 is this embodiment is relatively long compared to its diameter. Extending along a substantial length of snorkellike tube 119 is condenser section 320. Any significant condensable toxic products and corrosive products as well as working fluid vapors are condensed and collected by condenser section 320 and these are returned via tube 350 to a filtration system (not shown). The filtration system separates these recovered products and provides clean working fluid for subsequent utilization. Those toxic products and corrosive products which are not condensable are captured and retained by filter 330 which is coupled to snorkellike tube 119.

Any inward breathing through venting system 140 that accompanies work operations involving the creation of negative pressure differentials within enclosure 101 is not of consequence.

Apparatus for carrying out the process heretofore described is shown in FIG. 4. Similar to the simplified design shown in FIG. 1, this apparatus includes an enclosure 101 having first and second chambers 102 and 103, respectively. Access to chamber 102 is gained through aperture 104 and access to chamber 103 is gained through aperture 106. Seals 454 and 455 encircle aperture 104 and seal 456 encircles aperture 106. Near the bottom of chamber 103 are heaters 112 which are used to heat the liquid working fluid. At an intermediate position above the bottom of chamber 103 are condenser coils 114. As noted previously, condenser coils 114 are used to control the height of the zone of saturated working fluid vapor, produced by boiling liquid working fluid, above the liquid sump.

Coupled to chamber 102 is devaporization loop 130. Extending from an upper portion of chamber 103 is venting system 140. Since the operations of devaporization loop 130 and venting system 140 have been described at some length with respect to FIGS. 2 and 3, respectively, any further discussion with regard to these systems is believed to be unnecessary.

In order to facilitate the transportation of the object through the various stages of work operations, carriage system 420 is utilized. Carriage system 420, which is capable of being moved laterally through aperture 104, is comprised of a relatively open structure that includes end panels 421 and 422 held in a spaced-apart relationship by structural members 423. Affixed to end panel 421 is a pair of rollers 427. Similarly, affixed to end panel 422 is a pair of rollers 428.

Appended to enclosure 101 adjacent to aperture 104 is a partially enclosed housing 409. Mounted on oppositely disposed sidewalls of housing 409 is a pair of generally parallel rail segments 429. A similar pair of rail segments 430 are affixed to interior sidewalls of chamber 102. Rail segments 430 are generally parallel to one another and are generally in axial alignment with rail segments 429. Carriage system 420 is supported on rail segments 429 and 430 via rollers 427 and 428, respectively.

Undersides of rail segments 429 are configured to function as part of a rack and pinion drive mechanism 435 the latter of which is used to laterally transport carriage system 420 into and out of chamber 102. It should be noted that drive motor 431 is mounted on an outer surface of end panel 421 and, as a result, it is not exposed to any working fluid whether liquid or vapor, nor is it exposed to any toxic products or corrosive products which might be produced by the work operations.

Affixed between end panels 421 and 422 is hoist system 420. Hoist system 440 is used to transport object carrier 441 from a first position initially beneath carriage system 420 to a second position therewithin. To effect this transportation object carrier 441 is coupled via cables 442, through a system of idler pulleys 443, to drive mechanism 444. Similar to drive motor 431, motor 445 of hoist system 440 is mounted on a outer surface of end panel 421 for the same reasons heretofore discussed. Note the lattice-like construction for the bottom of object carrier 441. This particular construction facilitates draining from the object a substantial portion of the working fluid after exposure thereto.

Heaters 480 affixed to carriage system 420 serve to inhibit the formation of condensate thereon by maintaining the local temperature of carriage system 420 above the "dew point" of atmosphere 118.

The operation of carriage system 420 and hoist system 440 is best understood by referring to FIGS. 5 through 9. As shown in FIG. 5, initially object carried 441 is positioned beneath carriage system 420. This position facilitates loading or unloading of objects onto or from carrier 441. During loading or unloading aperture 106 is closed and sealed by pivotally mounted door 107, which is in engagement with seal 456, thereby preventing any convective interchange between atmosphere 115 in chamber 103 and atmosphere 118 in chamber 102. Moreover, any convective interchange between atmosphere 118 and external atmosphere 120 is prevented by end panel 422 which is in sealed engagement with seal 455 encircling the periphery of aperture 104 of chamber 102. Details of the seal arrangement will be described subsequently with respect to FIG. 10.

After the objects are loaded onto carrier 441, motor 445 is actuated and hoist system 440 transports the objects into carriage system 420 and locks it in place, as shown in FIG. 6. Drive motor 431 is then actuated and through the rack and pinion drive mechanism 435 carriage system 420 is laterally transported into chamber 102 via rollers 427 and 428 and rail segments 429 and 430, as shown in FIG. 7. During this transport operation end panels 421 and 422 function as movable barriers. End panel 422 which is positioned within chamber 102 lies in a first plane generally parallel with a plane containing aperture 104 and in such position seals aperture 104. However, as carriage system 420 commences its lateral movement into chamber 102, the seal around aperture 104 is released. When carriage system 420 is fully within chamber 102, end panel 421 is brought into sealed engagement with seal 454 encircling the periphery of aperture 104. In this position end panel 421 is outside chamber 102 and lies in a second plane generally parallel with a plane containing aperture 104.

With the object now in chamber 102 and aperture 104 sealed, door 107 is opened thereby breaking the seal around aperture 106. Motor 445 is again actuated thereby lowering object carrier 441, as shown in FIG. 8, into the saturated working fluid vapor 113 contained within chamber 103. The object is allowed to remain in the working fluid vapor 113 until it is heated by the saturated working fluid vapor giving up its sensible heat and latent heat of vaporization as it condenses on the object. As noted previously, as working fluid condensate begins to accumulate, it also begins to drain from the object. When the object has been heated to near the boiling point of the working fluid and sufficiently drained of condensate, it is ready for removal from chamber 103 and back into chamber 102.

As shown in FIG. 9, with object carrier 441 raised back into chamber 102, aperture 106 is closed and sealed by door 107. Thereafter, devaporization loop 130 is utilized to reduce the partial pressure of the working fluid vapor contained in the atmosphere within chamber 102 to the acceptable level. With the atmosphere within chamber 102 so conditioned, carriage system 420 is actuated and the object is removed from chamber 102.

During the time that object carrier 441 is outside chamber 102, as well as during the time it is inside chamber 102, aperture 104 is sealed. In the preferred embodiment seal 454 and 455 encircling aperture 104 comprise an inflatable seal arrangement as shown in partial section view in FIG. 10. Affixed to sidewall 1001 of chamber 102 is actuator support 1002, latch plate 1003, and seal retainer 1004. Positioned within seal retainer 1004 is inflatable seal 1005 which is inflatable with pressurized air 1020. One side of inflatable seal 1005 is fastened along an edge of aperture 104 whereas an opposite side is juxtaposed carriage end panel 421.

Affixed to end panel 421 is panel stiffener 1006 which has an aperture 1007 through its normal to the panel portion. After carriage system 420 transports the object into chamber 102, latch actuator 1008 is energized thereby driving latch pin 1009 through aperture 1010 in latch plate 1003 and aperture 1007 in panel stiffener 1006. Latch actuator 1008 is positioned on actuator support 1002 to facilitate this engagement. Once end panel 421 is latched in place, seal 1005 is inflated thereby forming a gastight seal around aperture 104.

It should be noted that a similar arrangement is used to seal aperture 104 when end panel 422 is juxtaposed during the time when the object is being loaded or unloaded from object carrier 441. Regardless of whether end panel 421 or end panel 422 is used as a movable barrier to seal aperture 104, the seal is such that it prevents any significant convective interchanger through aperture 104 due to pressure differentials which might be produced across the closure during the performance of work operations on the object.

A simplified alternative embodiment of apparatus for practicing the process described above is shown in FIG.

11. This apparatus includes enclosure 1101 comprised of tanklike structure 1102 and generally hollow conduitlike member 1103. Tanklike structure 1102 has an open end 1104 which is in communication with an intermediate opening 1105 in conduitlike member 103. At either end of conduitlike member 1103 are open ends 1106 and 1107, respectively.

Within tanklike structure 1102 are heaters 1108, liquid working fluid 1109 and condensing coils 1110. These elements function in the same manner, as heretofore described with respect to FIG. 1, to produce and maintain the zone of saturated working fluid vapor 1111. Consequently, no further discussion with regard to these elements is required.

A first segment 1112 of conduitlike member 1103 forms a portion of first chamber 1113. A second segment 1114 of conduitlike member 1103 in cooperation with tanklike structure 1102 forms a portion of second chamber 1115. Finally, a third segment 1116 of conduitlike member 1103 form a portion of third chamber 1117. Chambers 1113, 1115 and 1117 are completed upon the insertion of transport mechanism 1120 into conduitlike member 1103.

Transport mechanism 1120 is comprised of a plurality of interconnected cell-like members 1121. Each of cell-like members 1121 is bounded by first and second end panels 1122 and 1123, as shown, for example, in the cell-like member located just above tanklike structure 1102. It should be noted that first end panel 1122 of a given cell-like member 1121 also forms second end panel 1123 of an adjacent cell-like member and vice-versa.

Positioned within an intermediate region of each of cell-like members 1121 is a hoist system 1140 similar to that described previously with respect to FIG. 4. Hoist system 1140 facilitates the raising and lowering of object carrier 1141 during loading and unloading operations and during exposure of the object to working fluid vapor 1111.

Coupled to the top of second chamber 1115 is venting system 1130, while coupled to the top of third chamber 1117 is devaporization loop 1135. All of this apparatus has been described above and no further elaboration is necessary.

The general operation of the apparatus will be described by following the process sequence for a given object and its associated cell-like member. In practice several objects are processed simultaneously.

In operation an object to be exposed to working fluid vapor 1111 is placed into object carrier 1141 while it is open to a first atmosphere 1150. After loading, cell-like member 1121 is indexed laterally into conduitlike member 1103 and specifically to first segment 1112. In this position cell-like member 1121 in conjunction with first segment 1112 forms first chamber 1113. First end panel 1122 serves as a first closure means for controlling atmospheric interaction between atmosphere 1150 external to first chamber 1113 and second atmosphere 1151 internal thereto. Correspondingly, second end panel 1123 serves as a second closure means for controlling atmospheric interaction between atmosphere 1151 and atmosphere 1152, the latter of which is confined within second chamber 1115.

Following a dwell period of cell-like member 1121 in first segment 1112 during which other process steps are being performed on other objects, member 1121 is indexed laterally through conduitlike member 1103 to second segment 1114. In this position cell-like member 1121 in conjunction with second segment 1114 and tanklike structure 1102 forms second chamber 1115. First end panel 1122 now serves as the second closure means. However, second end panel 1123 now serves as a third closure means for controlling atmospheric interaction between atmosphere 1152 and atmosphere 1153.

With cell-like member 1121 positioned as described above, hoist system 1140 is actuated and object carrier 1141 is lowered into saturated working fluid vapor 1111. After the object has been exposed to working fluid vapor 1111 for the required time to elevate its temperature and draining of any working fluid condensate thereon has occurred, object carrier 1141 is raised to a position within cell-like member 1121. During these operations any pressure differentials, which may have occurred between atmospheres 1152 and 1150, are compensated by venting system 1130.

The work operation having been completed, cell-like member 1121 is transported laterally again to a new position at third segment 1116. In this position cell-like member 1121 in conjunction with third segment 1116 forms third chamber 1117. First end panel 1122 now serves as the third closure means and second end panel 1123 serves as a fourth closure means. This latter means controls atmospheric interaction between atmosphere 1153 and atmosphere 1150. While the object is in residence in third chamber 1117, devaporization loop 1135 is utilized to reduce the partial pressure of the working fluid vapor within atmosphere 1153 to the acceptable level.

After the acceptable level of working fluid vapor partial pressure is reached, cell-like member 1121 is again transported laterally. During this operation cell-like member 1121 emerges from conduitlike member 1103 so that the object, which has been operated upon through exposure to working fluid vapor 1111 can be advantageously removed from object carrier 1141.

Throughout the lateral transportation process including the indexing of cell-like member 1121 to its various positions within conduitlike member 1103, first and second end panels 1122 and 1123, respectively, conform to and seal with inner walls of conduitlike member 1103. Details of this seal arrangement will be considered subsequently with respect to a discussion of FIG. 13.

Another simplified alternative embodiment of apparatus for practicing our process, as heretofore described, is shown in FIG. 12. This apparatus includes enclosure 1201 comprised of tanklike structure 1202 and generally cylindrical housing 1203. Tanklike structure 1202 has an open end 1204 which is in coincident communication with opening 1205 in cylindrical housing 1203. Another opening 1206 in cylindrical housing 1203 is generally diametrically disposed with respect to opening 1205. Opening 1206 is in communication with atmosphere 1250 external to cylindrical housing 1203.

Similar to tanklike structure 1102, tanklike structure 1202 contains heaters, liquid working fluid and condensing coils. However, in FIG. 12 these elements are not shown for purposes of clarity and simplicity.

Cylindrical housing 1203 is subdivided spatially into sections 1207, 1208, and 1209, respectively, in addition to section 1210 which contains opening 1206. Sections 1207 and 1209, in conjunction with pairs of radically extending panels 1211 and 1212 on rotary structure 1213, form first and third chambers 1214 and 1216, respectively. Chamber 1214 contains atmosphere 1251 and chamber 1216 contains atmosphere 1253. Section 1208, in conjunction with a pair of panels 1211 and 1212 and tanklike structure 1202 form second chamber 1215. Chamber 1215 contains atmosphere 1252. Pairs of panels 1211 and 1212 form a plurality of cell-like members 1217 within rotary structure 1213 such that panel 1211 of a given cell-like member 1217 forms panel 1212 of an adjacent cell-like member 1217.

Positioned within each of cell-like members 1217 is a hoist system 1240 similar to that heretofore described. In addition, coupled to second chamber 1215 is a venting system and coupled to third chamber 1216 is a devaporization loop, neither of which is shown in FIG. 12 but which would be similar to their counterports shown in FIGS. 2 and 3.

In operation the object to be exposed to the working fluid vapor is placed into object carrier 1241 when it is lowered beneath opening 1206. Thereafter it is raised into a cell-like member 1217 in rotary structure 1213. Rotary structure 1213 is rotatably transported within cylindrical housing 1203 so that a given cell-like member 1217 is indexed to a number of predetermined positions. The first position is, as noted, that wherein cell-like member 1217 is open to atmosphere 1250 to permit loading and unloading of objects into and out of object carrier 1241.

After raising object carrier 1241 into section 1210, rotatory structure 1213 is rotatably indexed to a second position such that cell-like member 1217 is moved within section 1207. At this position cell-like member 1217, in conjunction with section 1207, forms first chamber 1214. Panel 1211 serves as a first closure means for controlling atmospheric interaction between atmosphere 1250 and atmosphere 1251. Correspondingly, panel 1212 serves as a second closure means to control atmospheric interaction between atmospheres 1251 and 1252.

Following a further indexing, cell-like member 1217 is brought to a third position such that, in conjunction with section 1208 and tanklike structure 1202, second chamber 1215 is formed. In this position panel 1211 serves as the second closure means whereas panel 1212 serves as a third closure means. This latter closure means controls atmospheric interaction between atmospheres 1252 and 1253. At this third position the object is exposed to the working fluid vapor in the manner similar to that heretofore described.

Once the object has been operated upon, cell-like member 1217 is again rotatably indexed, this time to a fourth position. At this position cell-like member 1217 in conjunction with section 1209 form third chamber 1216. Panel 1211 now serves as the third closure means and panel 1212 serves as a fourth closure means for controlling atmospheric interaction between atmospheres 1253 and 1250. The devaporization operation takes place in this position in a manner as previously described. Thereafter an additional rotational indexing returns cell-like member 1217 to its initial position for unloading.

Figure 13:
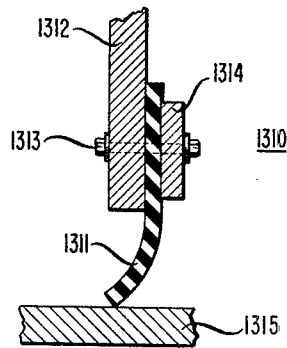
FIG. 13 illustrates the type of seals used in the alternative embodiments shown in FIGS. 11 and 12.

Throughout the movement of cell-like member 1121 in the embodiment illustrated in FIG. 11, or cell-like member 1217 in the embodiment illustrated in FIG. 12, the panels which form the closure means are maintained in sealed engagement with the walls of conduitlike member 1103 or cylindrical housing 1203, respectively, for the two embodiments. Seals 1310 for performing this function are illustrated in FIG. 13. A portion of flexible member 1311 is held in rigid engagement with an end portion of panel 1312 by fastener 1313. Platelike member 1314 provides a stiffening function so as to limit the amount of deflection of flexible member 1311.

As a cell-like member moves within its housing, flexible member 1311 wipes along the surface of the adjacent wall 1315. While the movement of panel 1312 is effected with relative ease, the frictional engagement of flexible member 1311 with wall 1315 virtually eliminates any interaction between the two atmospheres on either side of flexible member 1311.

In all cases it is to be understood that the above-described embodiments are illustrative of but a small number of many possible specific embodiments which can represent applications of the principles of the invention. Thus, numerous and various other embodiments can be devised readily in accordance with these principles by those skilled in the art without departing from the spirit and scope of the invention.

What is claimed is:

1. A process for controlling losses of a volatile working fluid during an operation involving exposure of an object thereto including the steps of:
   introducing said object into a first chamber and sealing said chamber by first closure means;
   opening second closure means separating said first chamber from a second chamber containing a source of working fluid at elevated temperature;
   conveying said object from said first chamber to said second chamber;
   elevating the temperature of said object to a level near the boiling point of said working fluid by exposure of said objects to said working fluid;
   removing said object from said second chamber into said first chamber and sealing said first chamber by closing said second closure means; and
   removing said object from said first chamber CHARACTERIZED IN THAT said process further includes, following the temperature elevating step, the step of
   draining from said object a substantial portion of the working fluid such that sensible heat acquired by said object upon said elevation of temperature is sufficient to evaporate working fluid remaining on said object upon its removal to said first chamber.

2. The process in accordance with claim 1 further including the step of
   heating surfaces within said first chamber so as to reduce any incidence of condensation of said working fluid on said surfaces and to enhance evaporation of any working fluid deposited thereon.

3. The process in accordance with claim 1 wherein, following the step of removing said object from said second chamber into said first chamber, said process further includes the step of
   recirculating an atmosphere within said first chamber through a closed devaporization loop coupled to said first chamber such that a partial pressure of a working fluid vapor contained within said atmosphere is reduced thereby allowing any working fluid remaining on said object to be evaporated into said atmosphere by means of said sensible heat of said object.

4. The process in accordance with claim 3 wherein the recirculating step further includes the steps of
   condensing said working fluid vapor contained within said first chamber recirculating atmosphere as it recirculates through said devaporization loop;
   collecting any working fluid condensate so formed for subsequent utilization;

reheating said atmosphere recirculating through said devaporization loop to a temperature such that said recirculating atmosphere is unsaturated upon its return to said first chamber; and filtering said atmosphere recirculating through said devaporization loop so as to remove corrosive products and toxic products.

5. The process in accordance with claim 4 wherein said process further includes the step of heating for a period of time said first chamber recirculating atmosphere to a temperature such that said recirculating atmosphere promotes evaporation of any working fluid liquid within said first chamber.

6. The process in accordance with claim 3 wherein, following the recirculating step, said process further includes the step of reducing further said partial pressure of said working fluid vapor contained in said first chamber atmosphere to a predetermined level by additional recirculation of said atmosphere through said devaporization loop.

7. The process in accordance with claim 6 wherein the reducing step further includes the steps of condensing said working fluid vapor contained within said first chamber recirculating atmosphere as it recirculates through said devaporization loop;

collecting any working fluid condensate so formed for subsequent utilization;

reheating said atmosphere recirculating through said devaporization loop to a temperature such that said recirculating atmosphere is unsaturated upon its return to said first chamber; and filtering said atmosphere recirculating through said devaporization loop so as to remove corrosive products and toxic products.

8. The process in accordance with claim 1 further including the step of equalizing any pressure differentials between an internal atmosphere within said first and second chambers and an external atmosphere by means of a snorkellike member.

9. The process in accordance with claim 8 further including the step of recovering any significant working fluid vapors tending to be emitted from said first and second chambers during any outward venting through said snorkellike member.

10. The process in accordance with claim 9 wherein said recovering step comprises condensing said working fluid vapors by chilling a portion of said snorkellike member such that any condensate so produced is retained.

11. The process in accordance with claim 10 further including the step of filtering said internal atmosphere from said first and second chambers tending to be emitted to said external atmosphere through said snorkellike member so that toxic products and corrosive products associated with said working flui vapor are captured and retained.

12. The process in accordance with claim 8 further including the step of extracting any significant working fluid vapors and toxic products and corrosive products associated therewith tending to be emitted from said first and second chambers during any outward venting through said snorkellike member.

13. A process for controlling losses of a volatile working fluid during an operation involving exposure of an object thereto including the steps of:

introducing said object into a first chamber and sealing said first chamber by first closure means;

opening second closure means between said first chamber and a second chamber, said second chamber containing a source of working fluid at elevated temperature;

conveying said object from said first chamber into said second chamber;

elevating the temperature of said object to a level near the boiling point of said working fluid by exposure of said object to said working fluid CHARACTERIZED IN THAT said process further includes the steps of draining from said object a substantial portion of the working fluid such that sensible heat acquired by said object upon said elevation of temperature is sufficient to evaporate working fluid remaining on said object upon its removal to said first chamber;

removing said object from said second chamber into a third chamber and sealing said third chamber by third closure means; and opening fourth closure means to permit said object to be removed from said third chamber.

14. The process in accordance with claim 13 further including the step of heating surfaces within said third chamber so as to reduce any incidence of condensation of said working fluid on said surfaces and to enhance evaporation of any working fluid deposited thereon.

15. The process in accordance with claim 13 further including the step of recirculating an atmosphere within said third chamber through a closed devaporization loop coupled to said third chamber such that a partial pressure of a working fluid vapor contained within said atmosphere is reduced thereby allowing any working fluid remaining on said object to be evaporated into said atmosphere by means of said sensible heat of said object.

16. The process in accordance with claim 15 wherein the recirculating step further includes the steps of condensing said working fluid contained within said third chamber recirculating atmosphere as it recirculates through said devaporization loop;

collecting any working fluid condensate so formed for subsequent utilization;

reheating said atmosphere recirculating through said devaporization loop to a temperature such that said recirculating atmosphere is unsaturated upon its return to said third chamber; and filtering said atmosphere recirculating through said devaporization loop so as to remove corrosive products and toxic products.

17. The process in accordance with claim 16 further including the step of heating for a period of time said third chamber recirculating atmosphere to a temperature such that said recirculating atmosphere promotes evaporation of any working fluid liquid within said third chamber.

18. The process in accordance with claim 15 wherein, following the recirculating step, said process further includes the step of reducing further said partial pressure of said working fluid vapor contained in said third chamber atmosphere to a predetermined level by additional recirculation of said atmosphere through said devaporization loop.

19. The process in accordance with claim 13 further including the steps of equalizing any pressure differentials between an internal atmosphere within said second chamber and an external atmosphere by means of a snorkellike member; and extracting any significant working fluid vapors and toxic products and corrosive products associated therewith tending to be emitted from said second chamber during any outward venting through said snorkellike member.

20. Apparatus for controlling losses of a volatile working fluid during an operation involving exposure of an object thereto including:

an enclosure having first and second juxtaposed chambers;

first closure means for controlling atmospheric interaction between a first atmosphere external to said first chamber and a second atmosphere internal to said first chamber;

second closure means for controlling atmospheric interaction between said second atmosphere and a third atmosphere internal to said second chamber;

a source of working fluid at an elevated temperature near the bottom of said second chamber; and means for conveying said object between said first atmosphere and said second atmosphere and between said second atmosphere and said third atmosphere such that said object is exposed to said working fluid for a time sufficient to elevate the temperature of said object to a level near the boiling point of said working fluid, CHARACTERIZED IN THAT, said apparatus further includes means, integral with said conveying means, for facilitating draining from said object a substantial portion of working fluid such that sensible heat acquired by said object upon said elevation of temperature is sufficient to evaporate working fluid remaining on said object upon its removal into said second atmosphere and prior to its removal to said first atmosphere.

21. The apparatus in accordance with claim 20 wherein each of said first and second closure means is sealable and thereby capable of preventing significant convective interchange through an associated aperture due to pressure differentials produced across said closure means during work operations on said object.

22. The apparatus in accordance with claim 21 wherein each of said first and second sealable closure means comprises:

a movable barrier;

means for securing said barrier in a position adjacent to its associated aperture; and inflatable seal means surrounding said aperture and having one side fastened to an edge thereof and an opposite side juxtaposed said barrier in its closed position such that upon inflation of said seal means a gastight seal is formed.

23. The apparatus in accordance with claim 22 wherein said conveying means comprises at least one carriage capable of being moved laterally through said associated aperture of said first closure means;

means, affixed to said carriage, for effecting movement of said carriage into and out of said first chamber;

an object carrier;

means, affixed to said carriage, for transporting said object carrier from a position within said carriage to a position beneath said carriage;

said carriage including first and second end panels, said first end panel serving as said first sealable closure means movable barrier when said carriage is within said first chamber and said second end panel serving as said first closure means movable barrier when said carriage is outside said first chamber.

24. The apparatus in accordance with claim 23 wherein said movement effecting means comprises:

a plurality of spaced-apart, generally parallel rail segments affixed to said enclosure;

a plurality of rollers affixed to said carriage and supporting said carriage on said rail segments; and means, affixed to an outer surface of said carriage, for driving said carriage transversely along said rail segments such that when said carriage is outside said first chamber said second end panel is inside said first chamber and lies in a first plane generally parallel with a plane of said first chamber aperture and when said carriage is inside first chamber said first end panel is outside said first chamber and lies in a second plane generally parallel with a plane of said first chamber aperture.

25. The apparatus in accordance with claim 20 further including:

means for heating surfaces within said first chamber so as to reduce any incidence of condensation of said working fluid on said surfaces and to enhance evaporation of any working fluid deposited thereon.

26. The apparatus in accordance with claim 20 further including:

a closed devaporization loop coupled to said first chamber for recirculating said second atmosphere internal to said first chamber such that a partial pressure of a working fluid vapor within said second atmosphere is reduced to a predetermined level.

27. The apparatus in accordance with claim 26 wherein said closed devaporization loop comprises:

means, coupled within said devaporization loop, for condensing said working fluid vapor contained within said second atmosphere as it recirculates through said loop;

means, coupled to said condensing means, for collecting any working fluid condensate so formed for subsequent utilization;

first heater means, coupled within said devaporization loop, for reheating said second atmosphere as it recirculates through said loop such that said recirculating second atmosphere is unsaturated upon its return to said first chamber; and means, coupled within said devaporization loop, for filtering said second atmosphere as it recirculates through said loop so as to remove corrosive products and toxic products.

28. The apparatus in accordance with claim 27 wherein said closed devaporization loop further includes:

second heater means, coupled within said devaporization loop, for heating for a period of time said recirculating second atmosphere to a temperature such that said recirculating second atmosphere promotes evaporation of any working fluid liquid within said first chamber.

29. The apparatus in accordance with claim 20 further including:
means for equalizing any pressure differentials between said second and third atmospheres within said enclosure and said first atmosphere external to said enclosure.

30. The apparatus in accordance with claim 29 wherein said equalizing means includes:
a snorkellike member affixed to said enclosure; and
means, coupled to said snorkellike member, for recovering any significant working fluid vapors tending to be emitted from said first and second chambers during any outward venting through said snorkellike member.

31. The apparatus in accordance with claim 30 wherein said recovering means comprises:
means for condensing said working fluid vapors to form a condensate; and
means for collecting any condensate so formed.

32. The apparatus in accordance with claim 31 wherein said equalizing means further includes:
means, coupled to said snorkellike member, for filtering said second and third atmospheres tending to be emitted to said first atmosphere through said snorkellike member so that toxic products and corrosive products associated with said working fluid vapor are captured and retained.

33. Apparatus for controlling losses of a volatile working fluid during an operation involving exposure of an object thereto including:
an enclosure having first, second and third chambers, said second chamber juxtaposed said first and third chambers;
first closure means for controlling atmospheric interaction between a first atmosphere external to said first, second and third chambers and a second atmosphere internal to said first chamber;
second closure means for controlling atmospheric interaction between said second atmosphere and a third atmosphere internal to said second chamber;
a source of working fluid at an elevated temperature near the bottom of said second chamber; and
means for conveying said object within said second chamber such that said object is exposed to said working fluid for a time sufficient to elevate the temperature of said object to a level near the boiling point of said working fluid, CHARACTERIZED IN THAT, said apparatus further includes:
means, integral with said conveying means, for facilitating draining from said object a substantial portion of working fluid such that sensible heat acquired by said object upon said elevation of temperature is sufficient to evaporate working fluid remaining on said object upon its removal to a fourth atmosphere within said third chamber;
third closure means for controlling atmospheric interaction between said third atmosphere and said fourth atmosphere;
fourth closure means for controlling atmospheric interaction between said fourth atmosphere and said first atmosphere prior to removal of said object from said third chamber; and
means for sequentially transporting said object from said first atmosphere through said second, third and fourth atmospheres and back to said first atmosphere.

34. The apparatus in accordance with claim 33 further including
means for heating surfaces within said second and third chambers so as to reduce any incidence of condensation of said working fluid on said surfaces and to enhance evaporation of any working fluid deposited thereon.

35. The apparatus in accordance with claim 33 further including
a closed devaporization loop coupled to said third chamber for recirculating said fourth atmosphere internal to said third chamber such that a partial pressure of a working fluid vapor within said fourth atmosphere is reduced to a predetermined level.

36. The apparatus in accordance with claim 35 wherein said closed devaporization loop comprises:
means, coupled within said devaporization loop, for condensing said working fluid vapor contained within said fourth atmosphere as it recirculates through said loop;
means, coupled to said condensing means, for collecting any working fluid condensate so formed for subsequent utilization;
first heater means, coupled within said devaporization loop, for reheating said fourth atmosphere as it recirculates through said loop such that said recirculating fourth atmosphere is unsaturated upon its return to said third chamber; and
means, coupled within said devaporization loop, for filtering said fourth atmosphere as it recirculates through said loop so as to remove corrosive products and toxic products.

37. The apparatus in accordance with claim 36 wherein said closed devaporization loop further includes:
second heater means, coupled within said devaporization loop, for heating for a period of time said recirculating fourth atmosphere to a temperature such that said recirculating fourth atmosphere promotes evaporation of any working fluid liquid within said third chamber.

38. The apparatus in accordance with claim 33 further including:
means for equalizing any pressure differentials between said third atmosphere within said second chamber and said first atmosphere external to said enclosure.

39. The apparatus in accordance with claim 38 wherein said equalizing means includes:
a snorkellike member affixed to said second chamber; and
means, coupled to said snorkellike member, for recovering any significant working fluid vapors tending to be emitted from said second chamber during any outward venting through said snorkellike member.

40. The apparatus in accordance with claim 39 wherein said recovering means comprises:
means for condensing said working fluid vapors to form a condensate; and
means for collecting any condensate so formed.

41. The apparatus in accordance with claim 40 wherein said equalizing means further includes:
means, coupled to said snorkellike member, for filtering said third atmosphere tending to be emitted to said first atmosphere through said snorkellike member so that toxic products and corrosive products associated with said working fluid vapor are captured and retained.

42. The apparatus in accordance with claim 33 wherein said enclosure comprises:
a tanklike structure having one open end; and
a generally hollow conduitlike member having two open ends and an opening intermediate said two ends, said intermediate opening coincident with said tanklike structure open end, a first segment of said conduitlike member on one side of said intermediate opening forming a portion of said first chamber and a third segment of said conduitlike member on an opposite side of said intermediate opening forming a portion of said third chamber, and a second segment of said conduitlike member intermediate said first and third segments in cooperation with said tanklike structure forming a portion of said second chamber.

43. The apparatus in accordance with claim 42 wherein said transporting means comprises:
a plurality of interconnected cell-like members, each of said cell-like members being bounded by a first and a second end panel, said first end panel of a given cell-like member also forming said second end panel of an adjacent cell-like member;
means for indexing a given cell-like member laterally through said conduitlike member to a number of predetermined positions wherein, at a first position said given cell-like member is open to said first atmosphere to facilitate loading of said object therein, at a second position said given cell-like member in conjunction with said conduitlike member first segment forms said first chamber with said first end panel serving as said first closure means and said second end panel serving as said second closure means, at a third position said given cell-like member in conjunction with said conduitlike member second segment and said tanklike structure forms said second chamber with said first end panel serving as said second closure means and said second end panel serving as said third closure means, at a fourth position said given cell-like member in conjunction with said conduitlike member third segment forms said third chamber with said first end panel serving as said third closure means and said second end panel serving as said fourth closure means, and at a fifth position said given cell-like member is open to said first atmosphere to facilitate removal of said object therefrom, during movement to and at said positions said end panels of said cell-like members conforming to and sealing with walls of said conduitlike member.

44. The apparatus in accordance with claim 33 wherein said enclosure comprises:
a tanklike structure having one open end; and
a generally cylindrical housing having first and second openings therein, said first opening coincident with said tanklike structure open end and said second opening generally diametrically disposed with respect to said first opening and in communication with said first atmosphere, a first section of said housing on one side of said first opening forming a portion of said first chamber, a third section of said housing on an opposite side of said first opening forming a portion of said third chamber, and a second section of said housing circumferentially interposed between said first and third sections and in conjunction with said tanklike structure forming a portion of said second chamber.

45. The apparatus in accordance with claim 44 further including:
a rotary structure contained within said housing and having a plurality of radially extending panels forming cell-like members within said rotary structure, each of said cell-like members bounded by a first and a second of said radially extending panels, said first radial panel of a given cell-like member also forming said second radial panel of an adjacent cell-like member; and
means for rotatably indexing a given cell-like member within said cylindrical housing to a number of predetermined positions wherein, at a first position said given cell-like member is open to said first atmosphere to facilitate loading and unloading of said object therein, at a second position said given cell-like member in conjunction with said cylindrical housing first section forms said first chamber with said first radial panel serving as said first closure means and said second radial panel serving as said second closure means, at a third position said given cell-like member in conjunction with said cylindrical housing second section and said tanklike structure forms said second chamber with said first radial panel serving as said second closure means and said second radial panel serving as said third closure means, at a fourth position said given cell-like member in conjunction with said cylindrical housing third section forms said third chamber with said first radial panel serving as said third closure means and said second radial panel serving as said fourth closure means, during movement to and at said positions said radial panels of said cell-like members conforming to and sealing with walls of said cylindrical housing.

* * * * *

UNITED STATES PATENT AND TRADEMARK OFFICE
CERTIFICATE OF CORRECTION

PATENT NO. : 4,264,299

DATED : April 28, 1981

INVENTOR(S) : Hans H. Ammann and Michael A. Oien

It is certified that error appears in the above—identified patent and that said Letters Patent is hereby corrected as shown below:

In the Abstract, line 22, "auxilliary" should read --auxiliary--. Column 11, line 58, "dvaporization" should read --devaporization--. Column 12, line 10, "working" should read --work--; line 26, "is" should read --in--. Column 13, line 27, "420" should read --440--; line 33 "a" should read --an--. Column 14, line 63, "interchanger" should read --interchange--. Column 15, line 5, "103" should read --1103--. Column 18, line 31, "objects" should read --object--. Column 19, line 60, "flui" should read --fluid--. Column 22, line 24, after "inside" insert --said--.

Signed and Sealed this

Seventh Day of September 1982

[SEAL]

Attest:

Attesting Officer

GERALD J. MOSSINGHOFF

Commissioner of Patents and Trademarks